US011459727B2

(12) United States Patent
Strashny et al.

(10) Patent No.: US 11,459,727 B2
(45) Date of Patent: Oct. 4, 2022

(54) COUPLING ASSEMBLY FOR A MACHINE

(71) Applicant: Caterpillar Global Mining LLC, Tucson, AZ (US)

(72) Inventors: Igor Strashny, Peoria, IL (US); Candace Bauer, Peoria, IL (US)

(73) Assignee: Caterpillar Global Mining LLC, Tucson, AZ (US)

( * ) Notice: Subject to any disclaimer, the term of this patent is extended or adjusted under 35 U.S.C. 154(b) by 641 days.

(21) Appl. No.: 16/453,231

(22) Filed: Jun. 26, 2019

(65) Prior Publication Data

US 2020/0407941 A1   Dec. 31, 2020

(51) Int. Cl.
*F16N 1/00* (2006.01)
*E02F 9/00* (2006.01)
*E02F 3/36* (2006.01)

(52) U.S. Cl.
CPC .............. *E02F 9/00* (2013.01); *E02F 3/3604* (2013.01); *F16N 1/00* (2013.01); *F16N 2210/14* (2013.01)

(58) Field of Classification Search
CPC .. E02F 9/00; E02F 3/3604; F16N 1/00; F16N 2210/14; F16L 27/087; F16C 11/045
USPC ............................................................ 184/6
See application file for complete search history.

(56) References Cited

U.S. PATENT DOCUMENTS

| | | | | |
|---|---|---|---|---|
| 3,951,234 A | * | 4/1976 | Fisher | F16C 33/103 184/41 |
| 4,270,286 A | * | 6/1981 | Mieger | E02F 3/96 251/339 |
| 5,046,930 A | * | 9/1991 | Lindstrom | F04B 39/0246 417/366 |
| 5,799,950 A | * | 9/1998 | Allen | F16C 33/102 277/503 |
| 5,810,115 A | | 9/1998 | Lubriquip | |
| 6,981,825 B2 | * | 1/2006 | Sugata | B23Q 11/103 408/59 |
| 7,651,274 B2 | * | 1/2010 | Yamamoto | E02F 9/006 384/473 |
| 2008/0089627 A1 | * | 4/2008 | Yamamoto | F16C 11/0614 384/473 |
| 2010/0158601 A1 | * | 6/2010 | Salas Madrid | E02F 9/006 403/38 |
| 2010/0239361 A1 | * | 9/2010 | Schmidt | B64C 25/18 403/37 |

(Continued)

FOREIGN PATENT DOCUMENTS

JP   2000204586 A   7/2000
JP   4772661 B2    9/2011

*Primary Examiner* — Michael R Mansen
*Assistant Examiner* — Mark K Buse

(57) ABSTRACT

The present disclosure is directed towards a coupling assembly (13) for a machine (10). The coupling assembled comprises a pin (27) comprising at least a first pin passageway (31) for lubricant extending between a first pin passageway inlet (32) and a first pin passageway outlet (33) for directing lubricant outside of the pin (27). The coupling assembly (13) also comprises a distribution device (28) for distributing lubricant comprising at least one distribution device inlet (45) for receiving lubricant and at least one distribution device outlet (46, 62, 47, 48). The distribution device (28) is mounted to the pin (27) and the at least one distribution device outlet (46, 62, 47, 48) is arranged to direct lubricant into the first pin passageway inlet (32).

18 Claims, 10 Drawing Sheets

(56) References Cited

U.S. PATENT DOCUMENTS

| | | | |
|---|---|---|---|
| 2014/0133948 A1* | 5/2014 | Hansen | F16C 17/02 |
| | | | 414/722 |
| 2014/0153997 A1* | 6/2014 | Ditzler | F16C 11/045 |
| | | | 403/38 |
| 2019/0032733 A1* | 1/2019 | Kelvin | F16D 65/00 |

* cited by examiner

COUPLING ASSEMBLY FOR A MACHINE

TECHNICAL FIELD

This disclosure is directed towards a coupling assembly for a machine. The present disclosure is further directed to a method of lubricating a coupling assembly of a machine.

BACKGROUND

Machines, including backhoe loaders, excavators, loaders and the like, commonly comprise one or more work tools, such as buckets, backhoes, arms, grapples and the like, attached to the machine by an arm arrangement, for example comprising a stick and a boom. Coupling assemblies may be provided to connect components together such that they can rotate relative to one another. For example, a stick may be rotatably mounted to a boom by a coupling assembly. Typically, the coupling assembly may comprise a pin rotatably mounted in one or more bearing housings and the components are mounted to the pin and one or more bearing housings.

Lubricant is commonly provided to the pin and one or more bearing housings in order to reduce the friction therebetween, thereby improving the performance and lifetime of the coupling assembly. The machine therefore may comprise a lubrication delivery system for delivering lubricant to one or more coupling assemblies of the machine. A lubrication delivery system may include a reservoir for storing lubricant, a pump for driving lubricant through the lubrication delivery system, distributor blocks for distributing quantities of lubricant to multiple outlets and lines or flexible hoses for fluidly connecting the reservoir, pump and the distributor blocks with the coupling assemblies. However, such lines or flexible hoses are exposed to falling debris and rocks in the working environment around the machine. Furthermore, the lubrication delivery system may be very complex, thereby increasing maintenance requirements, due to the high number of coupling assemblies requiring lubrication in such machines.

U.S. Pat. No. 7,651,274B2 discloses a spherical slide bearing having an outer ring and an inner ring slidably retained within the outer ring. A pin having a lubricant supply flow path extending through an interior thereof to open in an outer peripheral surface thereof is inserted into the inner ring so that the pin is circumferentially slidable, with the inner ring being equipped with a communication flow path establishing communication between a gap defined between the inner ring and the pin and a gap defined between the inner ring and the outer ring. The inlet port of the communication flow path is provided at a position where lubricant having flown out of an outlet port of the lubricant supply flow path flows after having flown through the gap between the pin and the inner ring substantially through the entire length in the axial direction of the pin. However, such a system still requires multiple lines or hoses for delivering lubricant.

SUMMARY

The present disclosure therefore provides a coupling assembly for a machine comprising: a pin comprising at least a first pin passageway for lubricant extending between a first pin passageway inlet and a first pin passageway outlet for directing lubricant outside of the pin; and a distribution device for distributing lubricant comprising at least one distribution device inlet for receiving lubricant and at least one distribution device outlet, wherein the distribution device is mounted to the pin and the at least one distribution device outlet is arranged to direct lubricant into the first pin passageway inlet.

The present disclosure further provides a method for lubricating a coupling assembly of a machine, the coupling assembly comprising a distribution device mounted to a pin, the method comprising: receiving lubricant through at least one distribution device inlet of the distribution device; directing the lubricant through at least one distribution device outlet of the distribution device; directing the lubricant from the distribution device outlet to the pin through a first pin passageway inlet, along a first pin passageway and to a first pin passageway outlet; and directing lubricant outside of the pin via the first pin passageway outlet.

BRIEF DESCRIPTION OF THE DRAWINGS

By way of example only, embodiments of apparatuses and methods of the present disclosure are now described with reference to, and as shown in, the accompanying drawings, in which.

DETAILED DESCRIPTION

The present disclosure is generally directed towards a rotatable coupling or joint assembly of a work machine which may reduce the number of lubricant hoses required. The coupling assembly comprises a pin and a distribution device and may comprise a bearing housing. The pin comprises a number of internal pin passageways for directing lubricant therein. The distribution device may split an input flow of lubricant into one or more predetermined quantities of lubricant and direct these predetermined quantities through one or more outlets. The bearing housing may house the pin and may communicate the lubricant between a lubricant delivery system and one or more of the internal pin passageways. The lubricant may enter a pin passageway and be directed to the distribution device, where it is split into one or more predetermined quantities and fed into one or more outlets of the distribution device. The lubricant may then enter one or more pin passageways. One or more of the pin passageways may direct lubricant to the interface between the pin and the bearing housing. One or more of pin passageways may also direct lubricant back through the bearing housing and into the lubricant delivery system. This outgoing stream of lubricant may then supply another coupling assembly.

Figure 1:
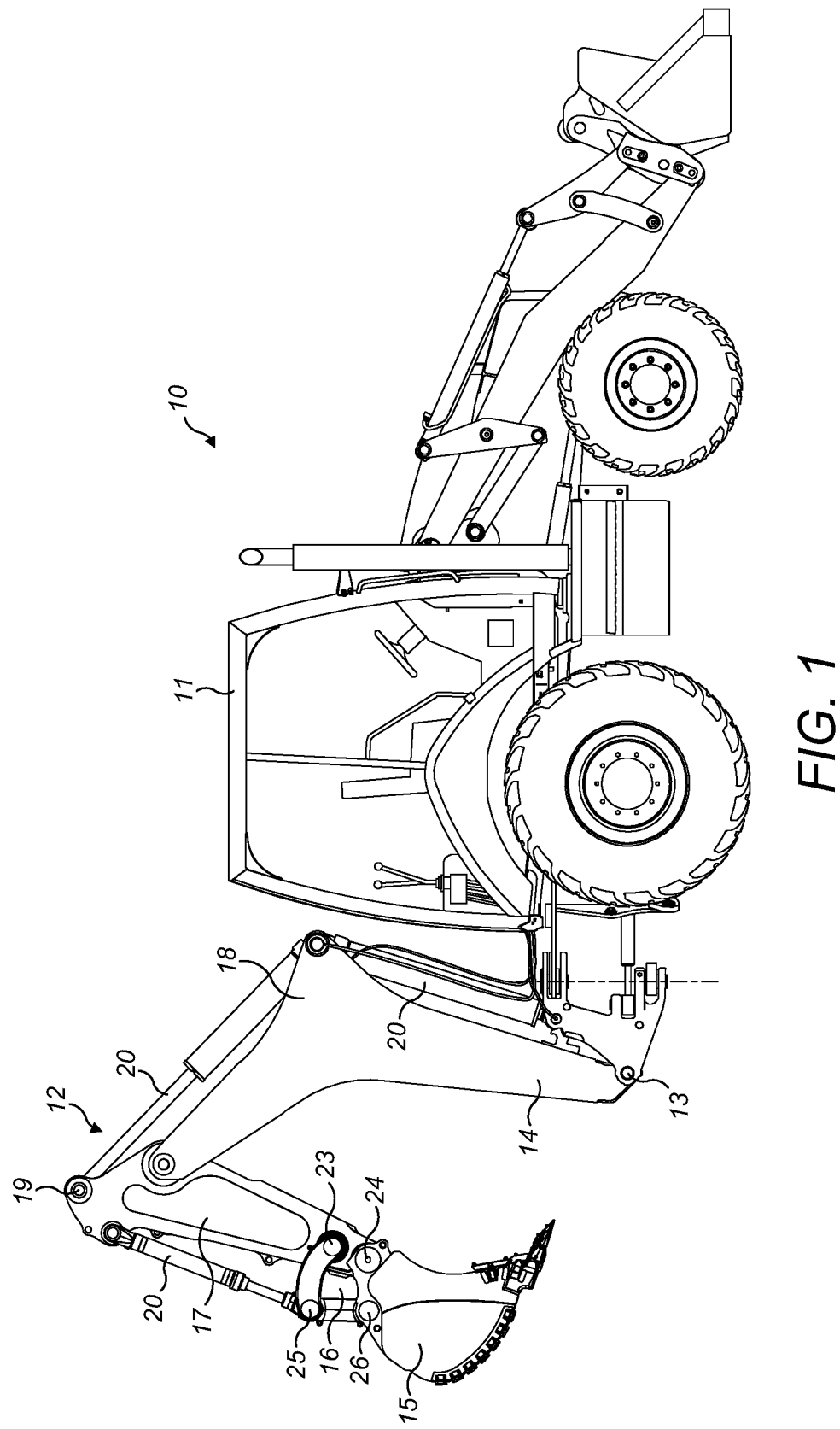
FIG. 1 is a side elevation of a machine comprising a plurality of coupling assemblies of the present disclosure.

FIG. 1 illustrates a machine 10 comprising at least one coupling assembly 13, 19, 23, 24, 25, 26 according to the present disclosure. The at least one coupling assembly 13, 19, 23, 24, 25, 26 may pivotally or rotatably connect at least two components of the machine 10 to one another. In the illustrated embodiment the machine 10 comprises a backhoe loader, although the machine 10 may be any other type comprising at least one coupling assembly 13, 19, 23, 24, 25, 26, such as a work machine, truck (e.g. a dump truck), excavator, another type of loader such as a wheel loader or track loader, dozer, shovel, material handler or telehandler.

The machine 10 may comprise a main body 11 and a work tool 12 pivotally attached to the main body 11 about a work tool coupling assembly 13. The work tool 12 may comprise an arm arrangement 14 pivotally mounted about the work tool coupling assembly 13 to the main body 11. The arm arrangement 14 may comprise a boom 18 rotatably attached to the stick 17 at a boom stick coupling assembly 19. The work tool 12 may comprise an implement 15 rotatably attached to the arm arrangement 14 by at least one implement coupling arrangement 16. The implement coupling arrangement 16 may facilitate pivoting of the implement 15 with respect to a stick 17 and is illustrated in further detail in FIG. 2. The implement coupling arrangement 16 may comprise a plurality of coupling assemblies 23, 24, 25, 26 in accordance with the present disclosure. The machine 10 may comprise at least one actuator 20 for controlling the work tool 12 by, for example, pivoting or rotating one or more of the components of the work tool 12 (e.g. the boom 18, stick 17 and implement 15) about the work tool coupling assembly 13, implement coupling arrangement 16 and boom stick coupling assembly 19 and thereby enabling the performance of work using the implement 15.

Figure 2:
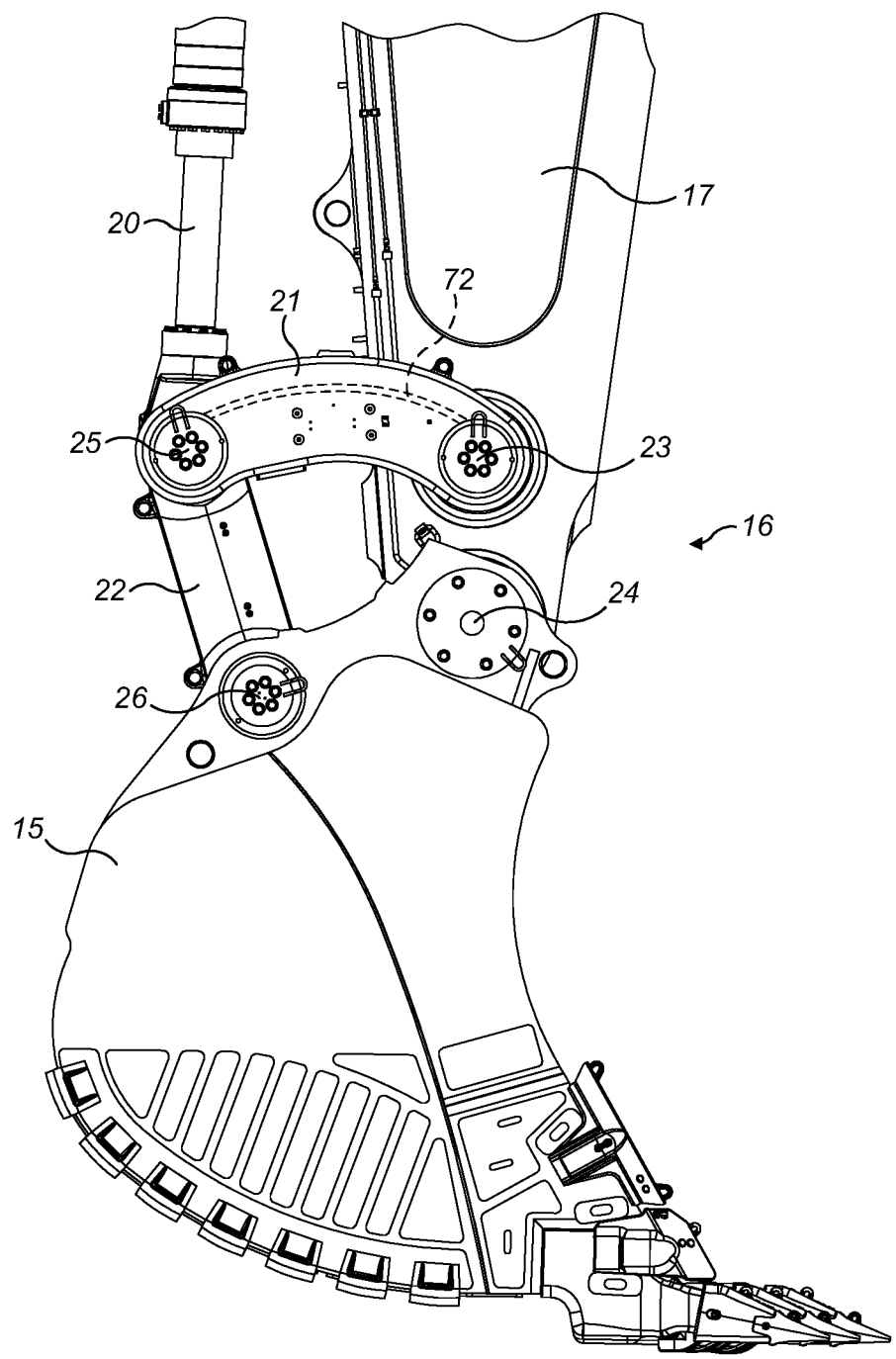
FIG. 2 is a side elevation of a work tool of the machine of FIG. 1.
Figure 3:
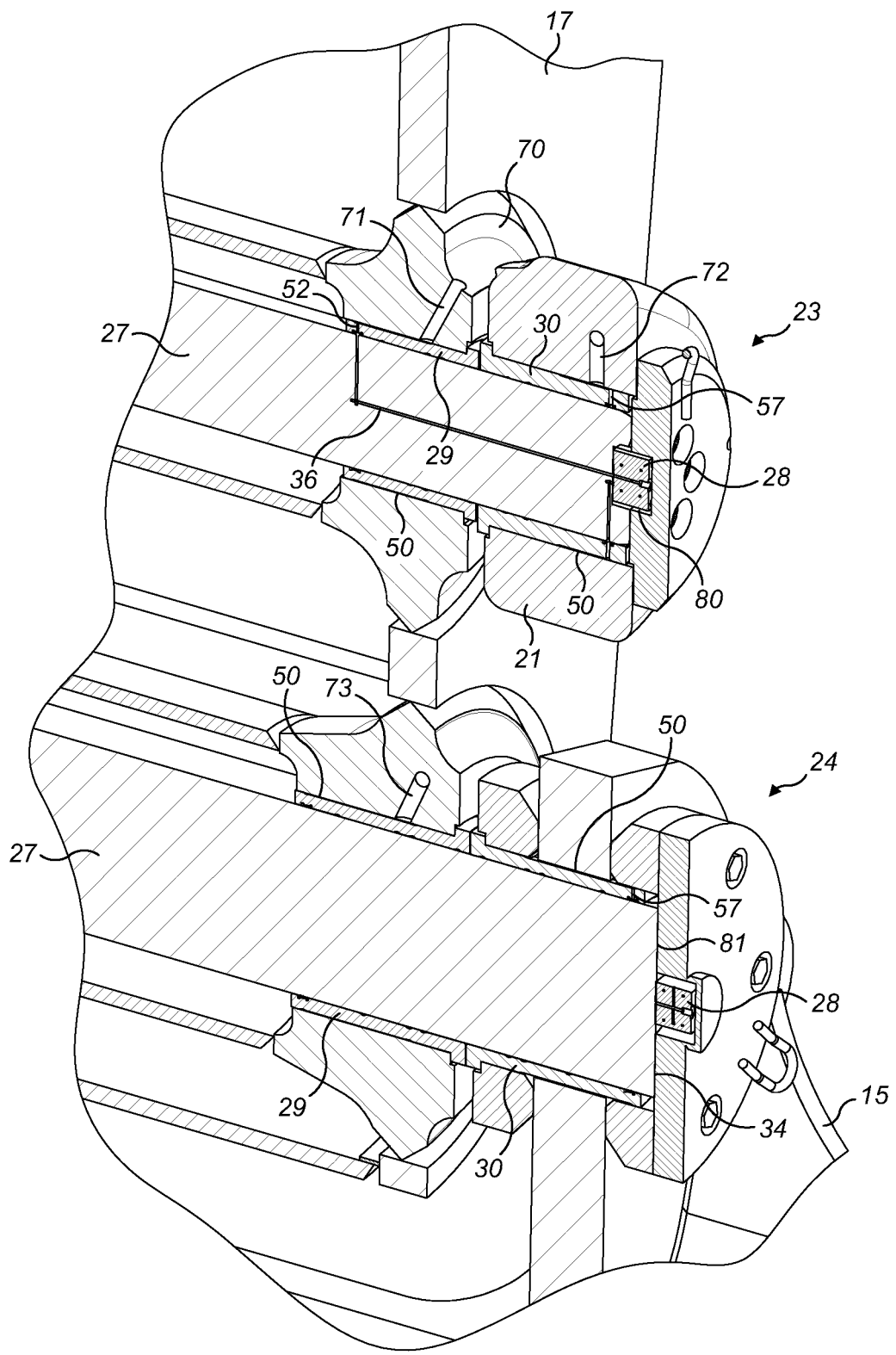
FIG. 3 is a perspective view of a cross section of an implement coupling arrangement of the work tool of FIG. 2.

The machine 10 may comprise a lubrication delivery system for delivering lubricant to the at least one coupling assembly 13, 19, 23, 24, 25, 26. The lubrication delivery system may comprise at least one reservoir of lubricant (not illustrated in the drawings) and at least one pump (not illustrated in the drawings) for directing lubricant through the lubrication delivery system. The lubrication delivery system may comprise at least one lubrication system passageway and/or flexible hose (not illustrated in the drawings) for directing lubricant from the reservoir, through the at least one pump and to the at least one coupling assembly 13, 19, 23, 24, 25, 26. At least one lubrication system passageway may be integrated inside the one or more components of the coupling arrangement (for example at least one of the stick 17, boom 18, implement 15, at least one first coupling arm 21 and/or at least one second coupling arm 22) and direct lubricant to the at least one coupling assembly 13, 19, 23, 24, 25, 26 of the present disclosure. In particular, as illustrated in FIG. 3, a first component 70 (in this case a component of the stick 17) may comprise a first lubrication system passageway 71 (e.g. bore) for directing lubricant to at least one coupling assembly 23. Although not shown, a hose or other lubrication system passageway may be mounted to the first lubrication system passageway 71 to deliver lubricant thereto. A second component 21 (in this case a first coupling arm 21 as discussed below) may comprise a second lubrication system passageway 72 that may extend between two coupling assemblies 23, 25, as illustrated in FIG. 2. Further lubrication passageways 73 may be located in other components and in fluid communication with other coupling assemblies 24, 26.

The coupling assembly 13, 19, 23, 24, 25, 26 of the present disclosure will be described with particular reference to its application in the implement coupling arrangement 16, but may be applied in any coupling assembly 13, 19, 23, 24, 25, 26 of the machine 10, such as the work tool coupling assembly 13 and boom stick coupling assembly 19. FIG. 2 illustrates the implement coupling arrangement 16 in further detail. The implement coupling arrangement 16 may comprise at least one first coupling arm 21 pivotally attached by a first coupling assembly 23 to the stick 17. The implement coupling arrangement 16 may comprise a second coupling assembly 24 pivotally connecting the stick 17 and the implement 15. The at least one first coupling arm 21 may be attached to at least one second coupling arm 22 by a third coupling assembly 25. The at least one second coupling arm 22 may be attached by a fourth coupling assembly 26 to the implement 15.

Figure 4:
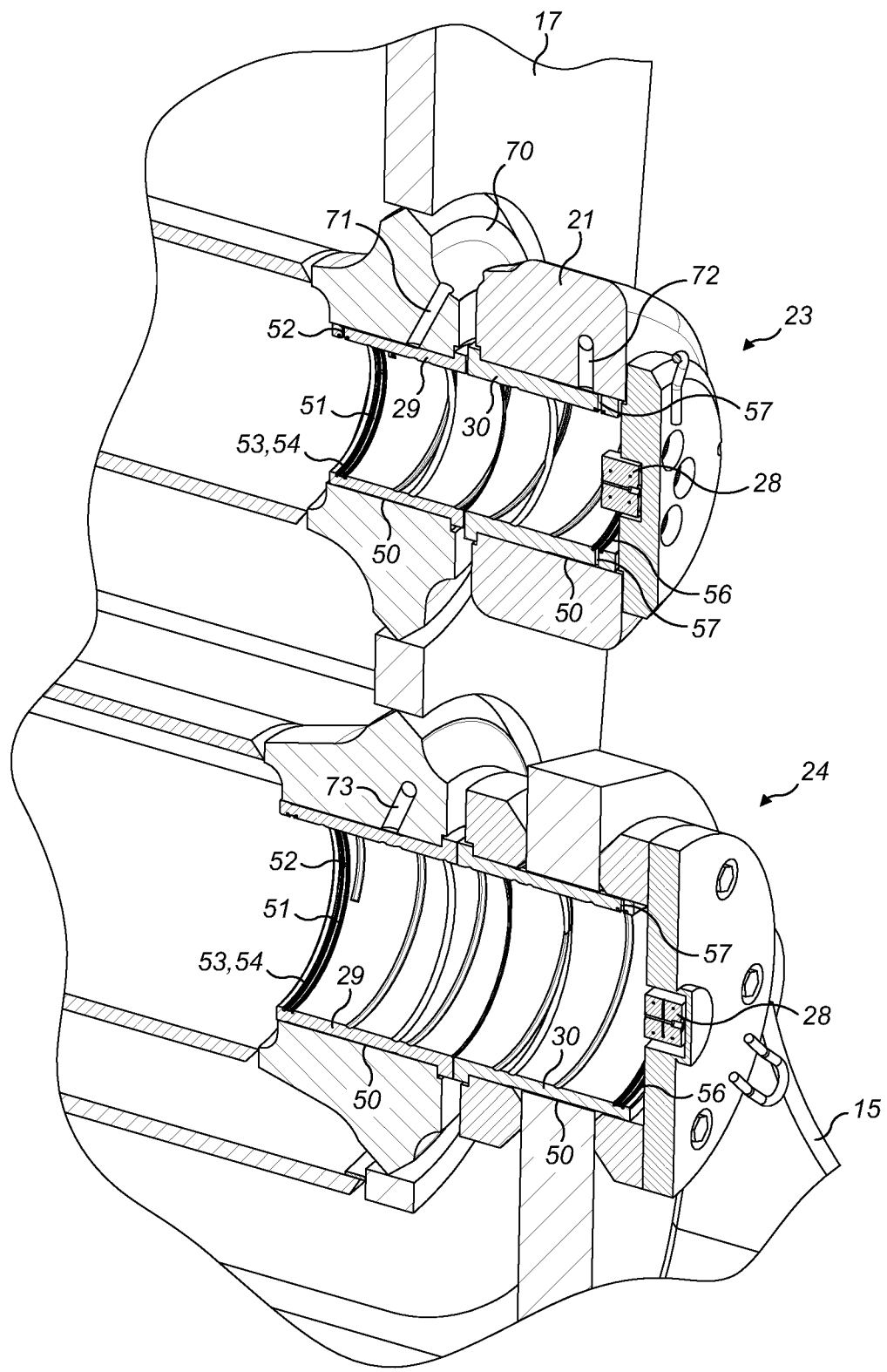
FIG. 4 is a perspective view of a cross section of an implement coupling arrangement of the work tool of FIG. 2 with pins hidden from view.
Figure 5:
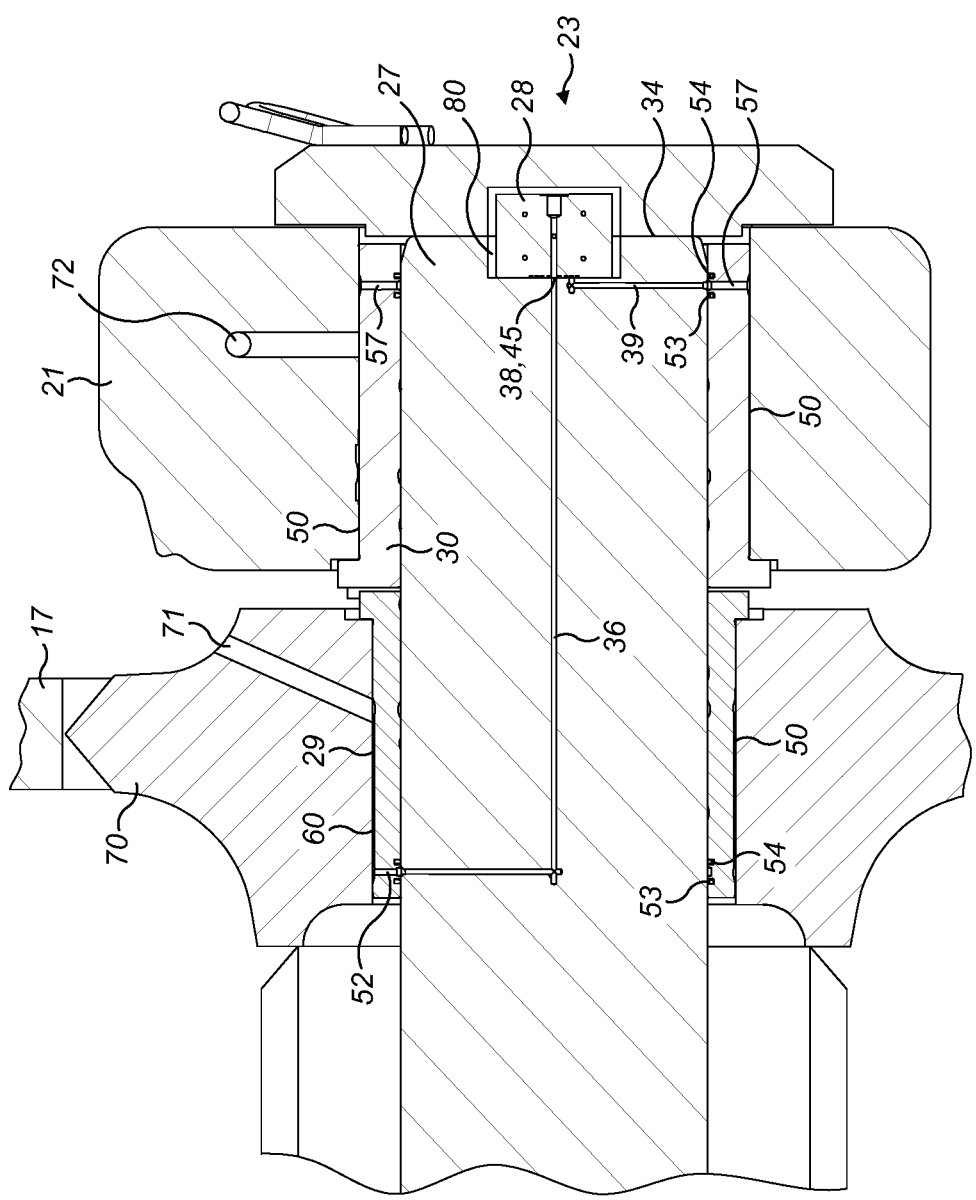
FIG. 5 is a side elevation of a cross section of a first coupling arrangement of the implement coupling arrangement of FIG. 2.
Figure 6:
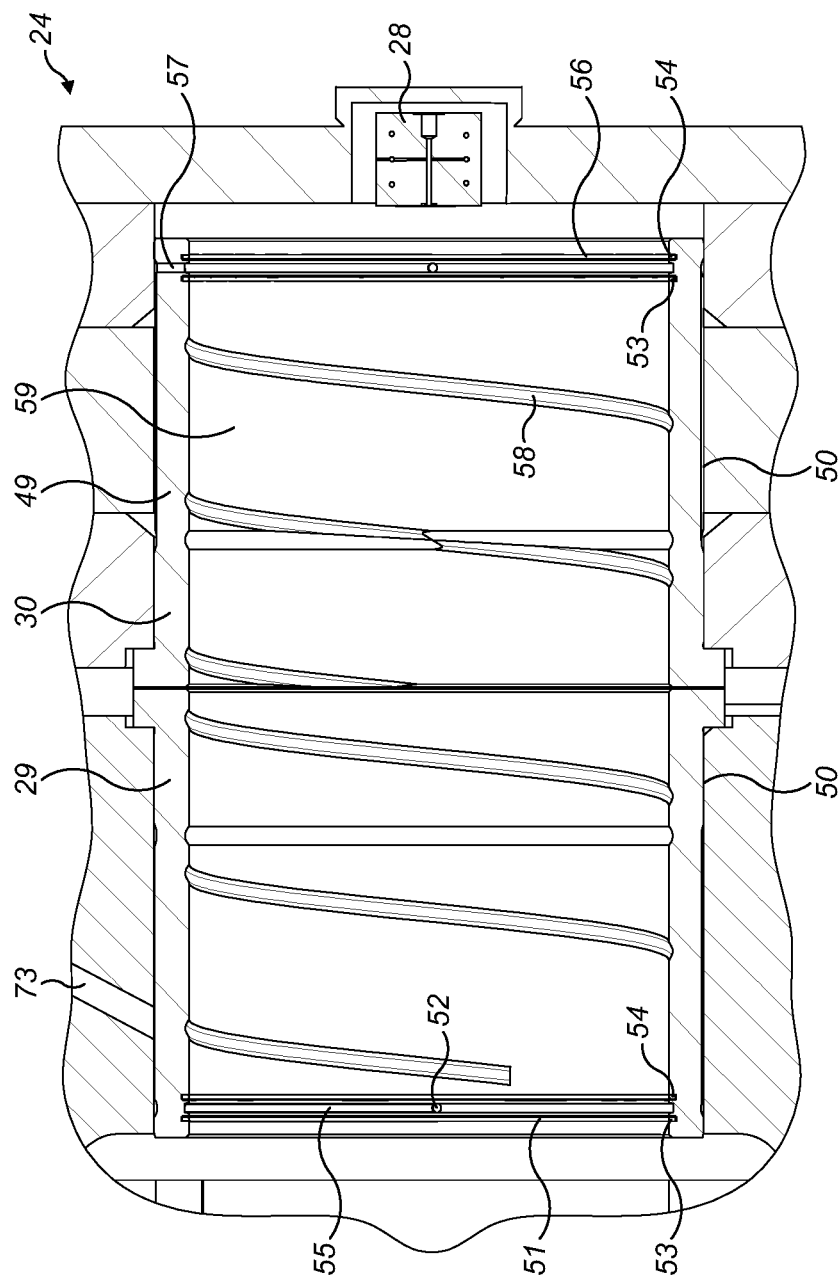
FIG. 6 is a side elevation of a cross section of a second coupling arrangement of the implement coupling arrangement of FIG. 2 with a pin hidden from view.

FIGS. 3 and 4 illustrate the first and second coupling assemblies 23, 24, FIG. 5 illustrates the first coupling assembly 23 and FIG. 6 illustrates the second coupling assembly 24. The following references to "the coupling assembly" applies to both the first and second coupling assemblies 23, 24 and the same reference numerals have been used to indicate the same features in the first and second coupling assemblies 23, 24 unless otherwise stated. The coupling assembly 23, 24 comprises a pin 27 and a distribution device 28 mounted to the pin 27. The coupling assembly 23, 24 may comprise one or more bearing housings 29, 30.

The pin 27 may be rotatably mounted in the one or more bearing housings 29, 30 and at least two components of the machine 10 (for example in the case of the first coupling assembly 23 the at least two components are the stick 17 and the first coupling arm 21) may be mounted to the one or more bearing housings 29, 30 such that the at least two components can pivot relative to one another by the relative movement between the pin 27 and the one or more bearing housings 29, 30. In particular, each component may comprise a component passageway 50 and one or more bearing housings 29, 30 may be mounted in the component passageway 50 such that the one or more bearing housings 29, 30 does not rotate relative to the component to which it is mounted. For example, as shown in FIG. 4, the first coupling assembly 23 may comprise at least two bearing housings 29, 30. A first bearing housing 29 may be mounted in a passageway of the stick 17 and a second bearing housing 30 may be mounted in a passageway of the first coupling arm 21. The pin 27 extends between the bearing housings 29, 30 of the stick 17 and first coupling arm 21 and they are therefore operable to pivot relative to one another about the pin 27. FIG. 4 shows only one end of the first and second coupling assembles 23, 24 and thus similar bearing housings 29, 30 may be located at the other hidden end.

In the present disclosure the lubrication delivery system directs lubricant to the distribution device 28, through at least one passageway in the pin 27 and to the interface between the one or more bearing housings 29 and pin 27 to provide lubrication of the first coupling assembly 23. As illustrated in detail in FIG. 7, the pin 27 comprises a first pin passageway 31 extending between a first pin passageway inlet 32 and a first pin passageway outlet 33. The pin 27 may comprise a second, third and/or fourth pin passageway 36, 39, 42 extending respectively between a second, third and/or fourth pin passageway inlet 37, 40, 43 and a second, third and/or fourth pin passageway outlet 38, 41, 44. The pin 27 may comprise additional pin passageways. The terms "first", "second", "third" and "fourth" are used herein for nomenclature purposes only rather than defining a quantity and are thus interchangeable.

The pin 27 may comprise a first end 34, a second end (not shown in the illustrations) and an outer surface 35, which may extend between the first and second ends 34 and may be cylindrical. The pin passageway inlets 32, 37, 40, 43 and outlets 33, 38, 41, 44 may be located at the first end 34, second end and/or outer surface 35. The first pin passageway inlet 32 may be located at the first end 34 and the first pin passageway outlet 33 may be located at the outer surface 35. The second pin passageway inlet 37 may be located at the outer surface 35 and the second pin passageway outlet 38 may be located at the first end 34. The third and/or fourth pin passageway inlet 40, 43 may be located at the first end 34 and the third and/or fourth pin passageway outlet 41, 44 may be located at the outer surface 35. The first and fourth pin passageway outlets 33, 44 may be located at the outer surface 35 between (i.e. parallel to the axis of rotation of the pin 27) the second pin passageway inlet 37 and third pin passageway outlet 41 as illustrated.

The first and fourth pin passageways 31, 42 may be configured to direct lubricant from the distribution device 28 to between the pin 27 and the one or more bearing housings 29, 30. The second pin passageway 36 may be configured to receive lubricant and direct the lubricant to the distribution device 28. The third pin passageway 39 may be configured to direct lubricant from the distribution device 28 to a different coupling assembly 13, 19, 23, 24, 25, 26.

The distribution device 28 may be mounted to the pin 27 at least partially in a recess 80 in the first end 34 of the pin 27 as illustrated in FIGS. 3 to 5 in the first coupling assembly 23. The distribution device 28 may thus be mounted to the pin 27 such that it is completely encapsulated by the recess 80 of the pin 27. Thus in the first coupling assembly 23 the first, third and fourth pin passageway inlets 32, 40, 43 and the second pin passageway outlet 38 may extend to and be located in the recess 80. Alternatively, the distribution device 28 may be mounted to a substantially flat surface 81 at the first end 34 of the pin 27 as illustrated in FIGS. 3, 4 and 6 in the second coupling assembly 24. The distribution device 28 may therefore be mounted completely outside the pin 27. Thus in the second coupling assembly 24 the first, third and fourth pin passageway inlets 32, 40, 43 and the second pin passageway outlet 38 extend to and are located at the flat surface 81. In further embodiments, the distribution device 28 may be mounted to the pin 27 such that part of the distribution device 28 is encapsulated by the pin 27 and part is outside the pin 27.

Figure 10:
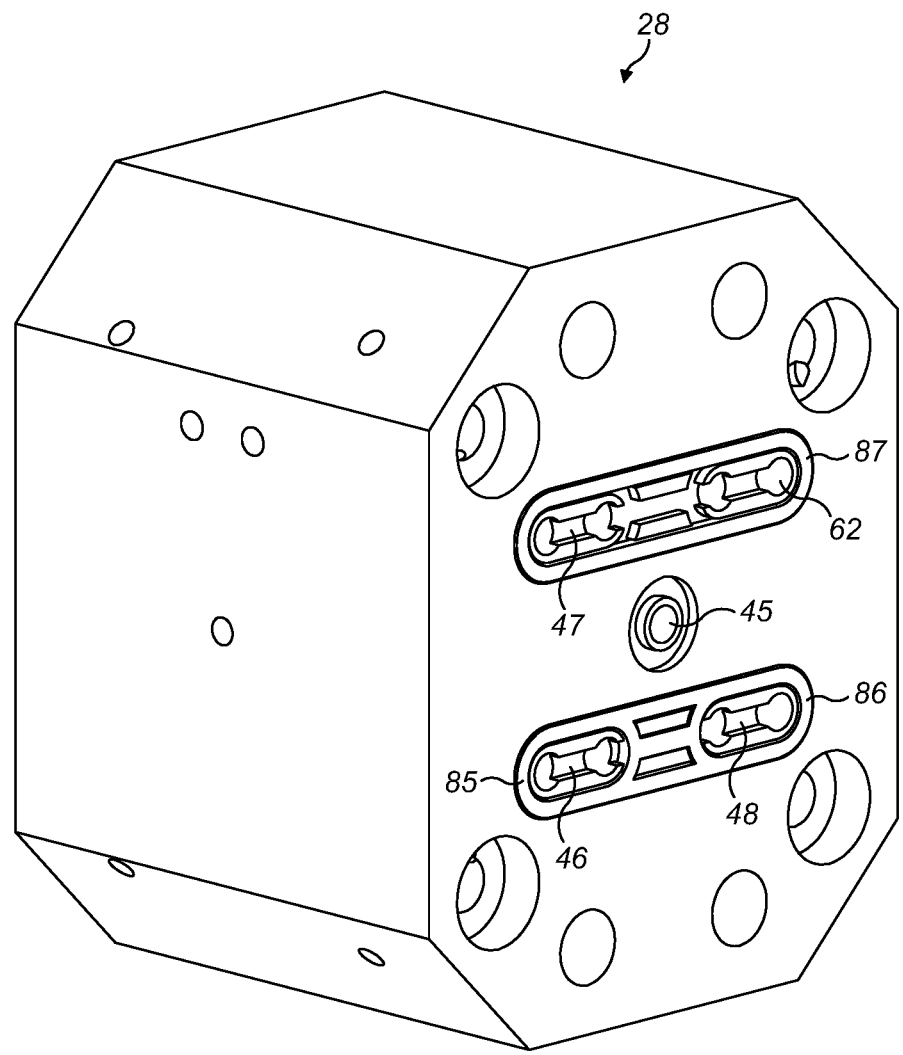
FIG. 10 is a perspective view of a distributor block of the implement coupling arrangement of FIG. 2.

The distribution device 28 is illustrated in further detail in FIG. 10 and comprises at least one distribution device inlet 45, which may be arranged to receive lubricant from the lubrication delivery system. The at least one distribution device inlet 45 may extend to the outside of the distribution device 28 and pin 27 (i.e. to an opposite side to that shown in FIG. 10) such that a hose or the like can be directly mounted to the at least one distribution device inlet 45. However, as illustrated in the Figures, the second pin passageway 36 may be configured to receive lubricant from the lubrication distribution system and direct the lubricant to the at least one distribution device inlet 45. In particular, the distribution device 28 may be mounted to the pin 27 such that the at least one distribution device inlet 45 is aligned with the second pin passageway outlet 38.

The distribution device 28 comprises at least one distribution device outlet 46, 62, 47, 48 for directing lubricant into first, third and/or fourth pin passageways 31, 39, 42. The at least one distribution device outlet 46 is arranged to direct lubricant into the first pin passageway inlet 32. In particular, first and/or fourth distribution device outlets 46, 48 may be arranged to direct lubricant to the first and/or fourth pin passageway inlets 32, 43. Therefore, the distribution device 28 may be mounted to the pin 27 such that the first and/or fourth distribution device outlets 46, 48 are aligned with the first and/or fourth pin passageway inlets 32, 43. Second and/or third distribution device outlets 62, 47 may be arranged to direct lubricant into the third pin passageway 40. In particular, the second and/or third distribution device outlet 62, 47 may be mounted to the pin 27 to be in fluid communication with the third pin passageway inlet 40. In particular, the lubricant from the second and/or third distribution device outlets 62, 47 may combine or merge prior to or upon entry to the third pin passageway 39. Therefore the third pin passageway inlet 40 may be arranged to receive lubricant from the second and/or third distribution device outlet 62, 47. Alternatively, the third pin passageway 39 may have a further third pin passageway inlet 40, such that the second and/or third distribution device outlet 62, 47 may each be aligned with the respective third pin passageway inlets 40 and the third pin passageway 39 may combine the lubricant flows therefrom.

The coupling assembly 23, 24 may comprise at least one elastomeric seal, such as an O-ring, rectangular, or D-ring seal arranged between the distribution device 28 and the pin 27, to form seals between the or each pin passageway 31, 36, 39, 42 and the respective distribution device inlet 45 or outlet 46, 62, 47, 48. Therefore, the at least one elastomeric seal may prevent lubricant from leaking between the pin 27 and the distribution device 28. A first distribution device elastomeric seal 85 may be present between the first distribution device outlet 46 and the first pin passageway inlet 32. A second distribution device elastomeric seal 86 may be present between the fourth distribution device outlet 48 and the fourth pin passageway inlet 43. The first and second distribution device elastomeric seals 85, 86 may be formed from a single elastomeric seal as illustrated in FIG. 10. A third distribution device elastomeric seal 87 may surround both the second and/or third distribution device outlets 62, 47 and the third pin passage way inlet 40. Therefore the third distribution device elastomeric seal 87 may effectively combine the outflow of lubricant from the second and/or third distribution device outlet 62, 47 prior to entry of the lubricant into the third pin passageway inlet 40. The first, second, and third elastomeric seals 85, 86, 87 may be substantially rectangular seals, optionally with rounded corners, as is illustrated in FIG. 10.

The distribution device 28 may be arranged to receive lubricant from the at least one distribution device inlet 45 and selectively distribute predetermined quantities of the received lubricant through the first, second, third and/or fourth distribution device outlets 46, 62, 47, 48. The distribution device 28 may operate in accordance with any known distribution block method and may comprise at least one spool, at least one spool passageway and at least one check valve for the or each distribution device outlet 46, 62, 47, 48. The distribution device 28 may operate as a single-line series progressive distributor. As is known in the art (and not illustrated in the Figures), the distribution device 28 may comprise at least one spool operable to move between first and second positions by backpressure caused by lubricant entering the at least one distribution device inlet 45. The at least one spool in the first position may block the communication of lubricant from the distribution device 28 to the first distribution device outlet 46 and in the second position may facilitate the communication of lubricant from the distribution device 28 to the first distribution device outlet 46. The distribution device 28 may contain a plurality of spools, which may, when in a second position, facilitate the communication of lubricant from the distribution device 28 to a respective distribution device outlet 46, 62, 47, 48. The distribution device 28 may be arranged to sequentially move each spool, therefore sequentially outputting the respective predetermined quantity of lubricant out of the respective distribution device outlet 46, 62, 47, 48. The internal geometry of the distribution device 28 and the spools may determine the predetermined quantities of lubricant distributed. The distribution device 28 may be arranged to follow a periodic/cyclic process, such that the pattern of the movement of the spools restarts once finished. The distribution device 28 may not need electrical control or input, and may work only by the input of lubricant, the internal geometry and the spools. The check valves may prevent lubricant from re-entering the at least one spool passageway from the at least one distribution device outlet 46, 62, 47, 48.

Figure 7:
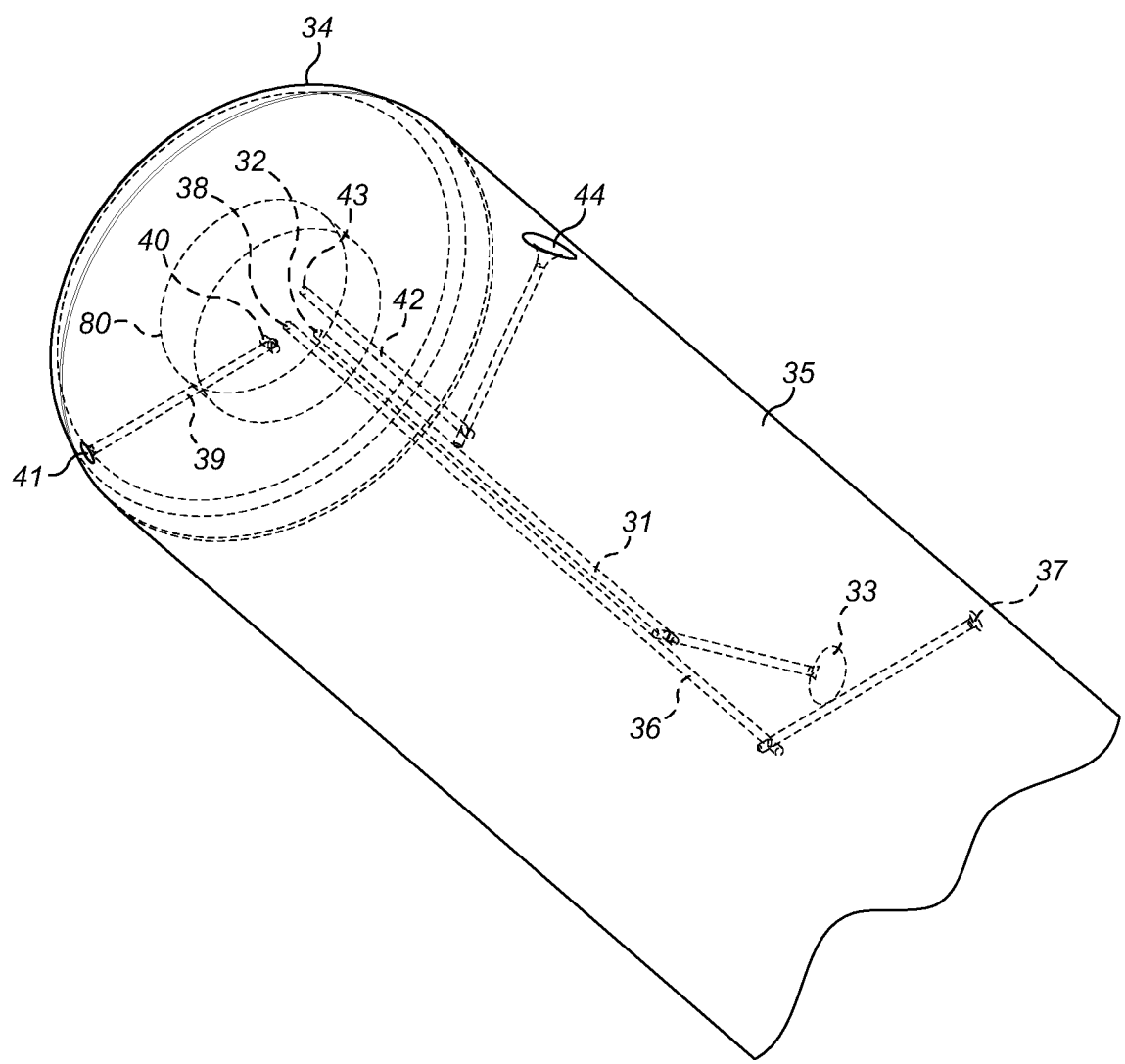
FIG. 7 is a transparent perspective view of a pin of the implement coupling arrangement of FIG. 2 showing pin passageways within the pin.
Figure 8:
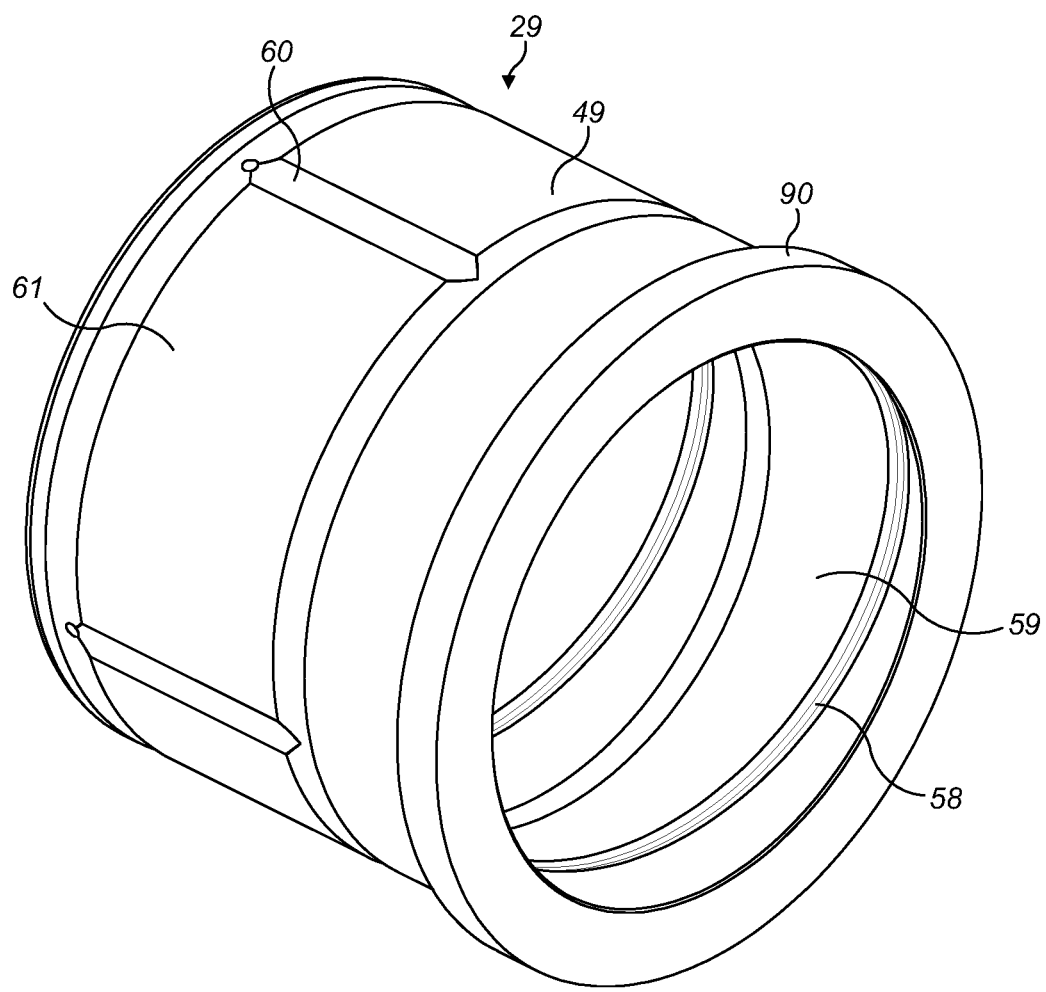
FIG. 8 is a perspective view of a bearing housing of the implement coupling arrangement of FIG. 2.
Figure 9:
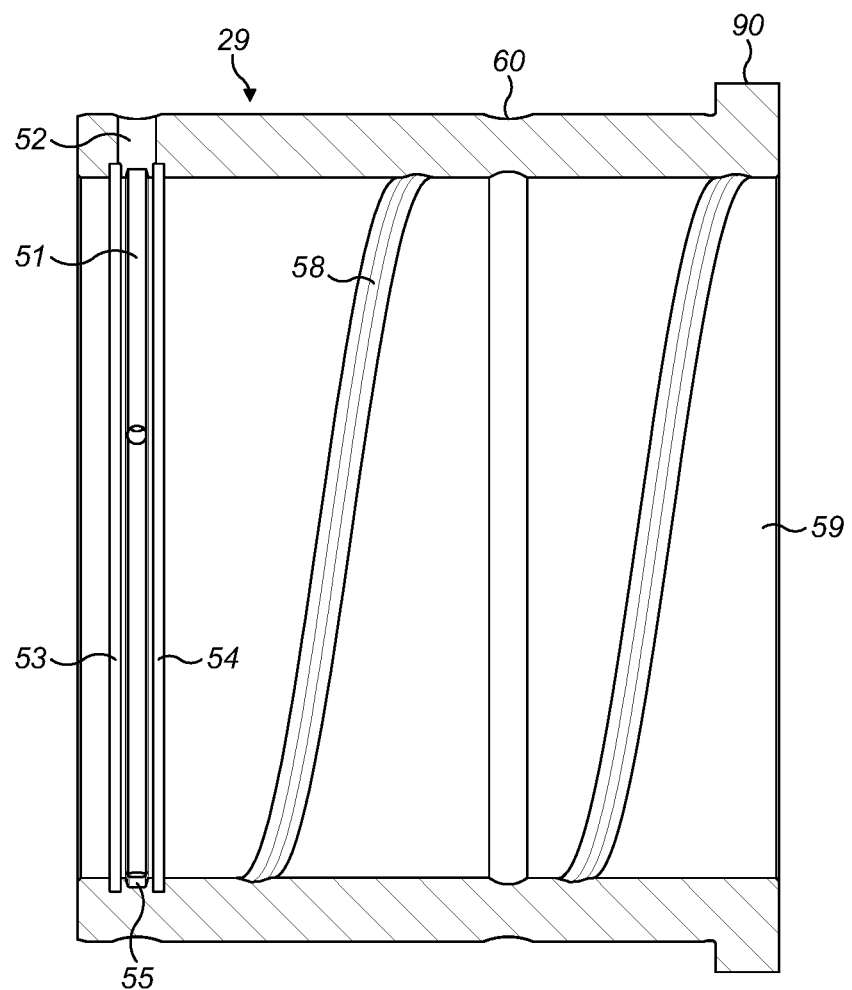
FIG. 9 is a perspective view of a cross section of the bearing housing of FIG. 8.

The one or more bearing housings 29, 30 may comprise, as illustrated in further detail in FIGS. 6 and 7 for the first bearing housing 29, a bearing housing main body 49, which may be a hollow cylinder, and a flange 90 attached to the bearing housing main body 49 for assisting in mounting the one or more bearing housings 29, 30 in the component passageway 50. The one or more bearing housings 29, 30 may comprise a first internal seal 51 and may comprise at least one housing input passageway 52 arranged to direct lubricant to the first internal seal 51. The pin 27 may be mounted in the one or more bearing housings 29 such that the second pin passageway inlet 37 is aligned with and arranged to receive lubricant from the at least one housing input passageway 52 via the first internal seal 51. The first internal seal 51 may comprise first and second elastomeric seals 53, 54. The elastomeric seal may be an O-ring as illustrated, D-ring, rectangular seal, or any other suitable elastomeric seal. The first and second elastomeric seals 53, 54 may be positioned on either side of the at least one housing input passageway 52 and around the outer surface 35 of the pin 27 and on either side of the second pin passageway inlet 37. The coupling assembly 23, 24 may therefore comprise an internal seal cavity 55, which may be torus-shaped and/or circumferential, between the outer surface 35 of the pin 27, the first elastomeric seal 53, the second elastomeric seal 54 and the bearing housing 29. The first internal seal 51 may prevent lubricant from leaking along the outer surface 35 of the pin 27 and may instead direct lubricant from the at least one housing input passageway 52 to the second pin passageway inlet 37. Despite the contact between pin 27 and the one or more bearing housings 29, the elastomeric seals 53, 54 may still facilitate rotation therebetween.

The one or more bearing housings 29, 30 may comprise at least one second internal seal 56 formed in a substantially similar manner. As shown in the Figures the first internal seal 51 may be formed on the first bearing housing 29 and the second internal seal 56 may be formed on the second bearing housing 30. The second internal seal 56 may be identical in design and/or function to the first internal seal 51. However, the second internal seal 56 may instead be aligned with an at least one housing output passageway 57 of the one or more bearing housings 29, 30 and the third pin passageway outlet 41. As a result, the second internal seal 56 may be arranged to direct lubricant from the third pin passageway 39 to the at least one housing output passageway 57. As discussed further below, the at least one housing output passageway 57 may direct the lubricant to the lubrication delivery system and particularly onto another coupling assembly 13, 19, 23, 24, 25, 26.

The pin 27 may be a floating pin 27 and may be able to move transversely (i.e. along the axis of rotation of the pin 27) in addition to rotating in the one or more bearing housings 29, 30. The distance the pin 27 may move transversely may depend upon the size of the coupling assembly 23, 24 and, for example, may be able to move transversely 2 to 4 mm in use. The internal seals 51, 56 of the one or more bearing housings 29, 30 may be especially able to facilitate a floating pin 27 in the present disclosure. The elastomeric seals 53, 54 may be able to maintain the internal seal cavity 55 for lubricant between the one or more bearing housings 29, 30 and the outer surface 35 of the pin 27 allowing the floating pin 27 to move transversely in use.

The one or more bearing housings 29, 30 may comprise at least one internal groove 58, which may be located on an inner surface 59 of the one or more bearing housings 29, 30 that engages the pin 27. The at least one internal groove 58 may be arranged to distribute lubricant received from the first and/or fourth pin passageway outlets 33, 44 to the interface between the pin 27 and the one or more bearing housings 29 in which the pin 27 is located. In particular, the at least one internal groove 58 may be aligned with the first and/or fourth pin passageway outlet 33, 44. The at least one internal groove 58 may be radial, helical, a mixture of radial and helical and/or any other suitable shape for distributing lubricant.

The one or more bearing housings 29, 30 may comprise at least one external groove 60, which may be located on an outer surface 61 of the one or more bearing housings 29, 30 that engages the component passageway 50 in which the one or more bearing housings 29, 30 is located. The at least one external groove 60 may be configured to communicate lubricant between the one or more component passageways 50 of the lubrication delivery system and the at least one housing inlet and/or output passageway 52, 57. The at least one housing inlet and/or output passageway 52, 57 may each be located at separate external grooves 60.

During operation of the machine 10, lubricant may be pumped by the at least one pump from the reservoir of the lubrication delivery system to at least one flexible hose. The at least one flexible hose may be mounted to a port over the first lubrication system passageway 71. The first lubrication system passageway 71 may direct the lubricant into the at least one external groove 60, which may direct the lubricant through the at least one housing input passageway 52 into the first internal seal 51. The first internal seal 51 may direct the lubricant into the second pin passageway inlet 37 and the second pin passageway 36 may direct the lubricant to the second pin passageway outlet 38. Lubricant may then be directed through the at least one distribution device inlet 45 and past the elastomeric seal arranged between the second pin passageway outlet 38, first end 34 of the pin 27, distribution device 28 and at least one distribution device inlet 45.

The distribution device 28 may then split the flow of lubricant and meter predetermined quantities of the lubricant out of the first, second, third and/or fourth distribution device outlets 46, 62, 47, 48. In particular, lubricant may pass into the distribution device 28, and may be sequentially directed to the first, second, third and/or fourth distribution device outlets 46, 62, 47, 48 by the position of the one or more spools. The change in position of the one or more spools may result from the backpressure caused by the lubricant entering the distribution device 28. The at least one check valve may allow lubricant to exit the first, second, third and/or fourth distribution device outlets 46, 62, 47, 48 and may prevent lubricant from re-entering the distribution device 28.

Lubricant may then be sequentially directed from the first, second, third and/or fourth distribution device outlet 46, 62, 47, 48 to the first, third and/or fourth pin passageway inlet 32, 40, 43 and past the elastomeric seal(s) acting as interface(s) therebetween. In particular, lubricant may be sequentially directed from the first and/or fourth distribution device outlet 46, 48 to the first and/or fourth pin passageway inlet 32, 43. Additionally, lubricant may be sequentially directed from the second and/or third distribution device outlet 62, 47 to the third pin passageway 39. Lubricant may then be directed from the first, third and/or fourth pin passageway inlet 32, 40, 43 through the first, third and/or fourth pin passageway 31, 39, 42 to the first, third and/or fourth pin passageway outlet 33, 41, 44. After exiting the first and/or fourth pin passageway outlets 33, 44, lubricant may pass into the internal grooves 58 of the one or more bearing housings 29, 30. The lubricant may then be spread across the interface between the pin 27 and bearing housing 29 for lubrication.

After exiting the third pin passageway outlet 41, lubricant may enter the second internal seal 56 and be directed through the at least one housing output passageway 57. The lubricant may then be directed from the at least one housing output passageway 57, for example along at least one external groove 60, to the lubricant delivery system, such as to the second lubrication system passageway 72. The lubricant may then travel through the second lubrication system passageway 72 to another coupling assembly 13, 19, 23, 24, 25, 26. For example, lubricant may output the first coupling assembly 23 and be delivered to the second, third and/or fourth coupling assembly 24, 25, 26. FIG. 2 in particular illustrates the second lubrication system passageway 72 extending from the first coupling assembly 23 to the third coupling assembly 25 for delivering lubricant thereto. The process may continue for at least some of or all of the coupling assemblies 13, 19, 23, 24, 25, 26, which may be arranged in series and/or parallel to one another.

In the above description reference has been made to first, second, third and fourth pin passageways 31, 36, 39, 42. However, the coupling assembly 23, 24 may comprise any number of first, second, third and fourth pin passageways 31, 36, 39, 42. Furthermore, multiple distribution devices 28 may be mounted to the pin 27 with at least one distribution device outlet 46, 62, 47, 48 of one distribution device 28 leading to at least one distribution device inlet 45 of a further distribution device 28.

INDUSTRIAL APPLICABILITY

By delivering lubricant through the first and/or fourth pin passageway 31, 42, the lubricant may enter the interface between the pin 27 and one or more bearing housings 29, 30. As a result, external hoses and the like may not be required to deliver lubricant directly to the area of the interface where it is required. Instead, the lubricant delivery system may deliver lubricant to the distribution device 28 (e.g. through the pin 27).

The distribution device 28 may not require external input or control, and may operate passively. Therefore, if a sufficient amount of lubricant and a sufficient pressure is provided, the distribution device 28 may sequentially distribute one or more predetermined quantities of lubricant to the respective one or more passageway outlets 33, 41, 44. This may simplify the system and may ensure it is more robust.

By mounting the distribution device 28 to the pin 27, only a single input system may be required to direct lubricant to the pin 27, such as via the at least one housing input passageway 52 and second pin passageway 36. By the distribution device 28 having multiple distribution device outlets 46, 62, 47, 48 and fewer distribution device inlets 45 than distribution device outlets 46, 62, 47, 48, fewer flexible hoses and the like may be required to deliver lubricant to multiple points at the interface between the pin 27 and the one or more bearing housings 29, 30.

The implementation of the housing input passageway 52 may result in the reduction of vulnerable external lines as the housing input passageway 52 may enable the communication of lubricant entirely internally within the components of the machine 10 from a single port on the outside of the component to the second pin passageway 36 via the first lubrication system passageway 71. The internal seals 51, 56 may prevent lubricant from leaking along the outer surface 35 of the pin 27.

The pin 27, distribution device 28 and one or more bearing housings 29 may be configured to direct lubricant received at the distribution device 28 back to the lubrication delivery system for onward communication to further coupling assemblies 13, 19, 23, 24, 25, 26. In particular, the second internal seal 56, the third pin passageway 39 and the at least one housing output passageway 57 may allow lubricant to pass through the first coupling assembly 23 in the present disclosure and back into the lubrication delivery system. This may allow the lubrication delivery system to deliver lubricant to a number of other coupling assemblies 13, 19, 24, 25, 26 arranged in series or in parallel. Thus a single flexible hose mounted to a single port on the outside of the component delivering lubricant to the second pin passageway 36 can be used to feed lubricant to a plurality of coupling assemblies 13, 19, 23, 24, 25, 26. This may significantly reduce the number of flexible hoses and other such lines of the lubrication delivery system, thus reducing the likelihood of them being struck by debris or the like whilst undertaking work.

The internal grooves 58 of the one or more bearing housings 29, 30 ensures that lubricant leaving the first and fourth pin passageway outlets 33, 44 is evenly distributed around the interface between the pin 27 and the one or more bearing housings 29. Thus the lubricant may thus be more effective in reducing friction between the pin 27 and the one or more bearing housings 29.

The invention claimed is:

1. A coupling assembly for a machine, the coupling assembly comprising:
   a pin comprising a first pin passageway for a lubricant extending between a first pin passageway inlet and a first pin passageway outlet for directing the lubricant outside of the pin; and
   a distribution device for distributing the lubricant, the distribution device comprising a distribution device inlet for receiving the lubricant and a distribution device outlet,
   wherein the distribution device is mounted to the pin and the distribution device outlet is arranged to direct lubricant into the first pin passageway inlet, and
   wherein the pin further comprises a second pin passageway extending between a second pin passageway inlet and a second pin passageway outlet, the second pin passageway outlet being positioned in fluid communication with the distribution device inlet for directing the lubricant into the distribution device inlet, and the second pin passageway inlet being positioned in fluid communication with a lubrication delivery system for receiving the lubricant from the lubrication delivery system.

2. The coupling assembly according to claim 1, wherein the distribution device is integrated inside the pin.

3. The coupling assembly according to claim 1, wherein the distribution device receives lubricant from the distribution device inlet, and distributes a predetermined quantity of lubricant to the distribution device outlet.

4. The coupling assembly according to claim 1, wherein the pin further comprises a third pin passageway extending between a third pin passageway inlet and a third pin passageway outlet, the distribution device includes a plurality of distribution device outlets including a first distribution device outlet and a second distribution device outlet, the distribution device outlet being the first distribution device outlet, and wherein the first distribution device outlet is arranged to direct lubricant into the first pin passageway inlet and the second distribution device outlet is arranged to direct lubricant into the third pin passageway inlet.

5. The coupling assembly according to claim 4, wherein the distribution device is configured to distribute a first predetermined quantity of lubricant to the first distribution device outlet, and a second predetermined quantity of lubricant to the second distribution device outlet.

6. The coupling assembly according to claim 1, wherein the first pin passageway inlet is located at an end of the pin.

7. The coupling assembly according to claim 1, further comprising one or more bearing housings in which the pin is rotatably mounted.

8. The coupling assembly according to claim 7, wherein the one or more bearing housings comprises at least one housing input passageway arranged for communicating lubricant from the lubrication delivery system to the second pin passageway inlet.

9. The coupling assembly according to claim 8, wherein the pin further comprises a third pin passageway extending between a third pin passageway inlet and a third pin passageway outlet, and wherein the one or more bearing housings comprises at least one housing outlet passageway arranged for communicating lubricant from the third pin passageway outlet to the lubrication delivery system.

10. The coupling assembly according to claim 9, wherein the one or more bearing housings comprises external grooves arranged for communicating lubricant between the lubrication delivery system and the at least one housing inlet passageway and/or the at least one housing outlet passageway.

11. The coupling assembly according to claim 9, wherein the one or more bearing housings comprises:

a first internal seal for sealing lubricant communicated between the at least one housing input passageway and the second pin passageway inlet; and a second internal seal for sealing lubricant communicated between the third pin passageway outlet and the at least one housing input passageway.

12. The coupling assembly according to claim 9, wherein the one or more bearing housings comprises internal grooves for distributing lubricant received from the first pin passageway outlet to between the pin and the one or more bearing housings.

13. The coupling assembly according to claim 1, wherein the distribution device is located outside the pin.

14. The coupling assembly according to claim 1, wherein the pin includes an outer surface that extends from a first end of the pin to a second end of the pin, and the first pin passageway inlet is located at the outer surface of the pin.

15. The coupling assembly according to claim 1, wherein the distribution device includes a plurality of distribution device outlets, and the distribution device outlet is a first distribution device outlet of the plurality of distribution device outlets.

16. The coupling assembly according to claim 15, wherein the distribution device is configured to operate as a single-line series progressive distributor, and deliver a predetermined quantity of lubricant to each distribution device outlet of the plurality of distribution device outlets.

17. A machine comprising:

a coupling assembly including a pin comprising a first pin passageway extending between a first pin passageway inlet for receiving a lubricant, and a first pin passageway outlet for directing the lubricant outside of the pin, and a distribution device for distributing the lubricant, the distribution device comprising a distribution device inlet for receiving the lubricant and a distribution device outlet for discharging the lubricant, wherein the distribution device is mounted to the pin and the distribution device outlet is arranged to direct lubricant into the first pin passageway inlet;

a first component;

a second component rotatable relative to the first component about the pin; and a lubrication delivery system for delivering the lubricant to the coupling assembly and/or receiving the lubricant from the coupling assembly, wherein the distribution device is configured to operate as a single-line series progressive distributor, and deliver a predetermined quantity of lubricant to each distribution device outlet of the plurality of distribution device outlets.

18. A method for lubricating a coupling assembly of a machine, the coupling assembly comprising a distribution device mounted to a pin, the pin defining a first pin passageway and a second pin passageway, the method comprising:

receiving a lubricant at a first pin passageway inlet of the first pin passageway from a lubrication delivery system;

directing the lubricant through the first pin passageway to a first pin passageway outlet;

directing the lubricant from the first pin passageway outlet into the distribution device via a distribution device inlet;

directing the lubricant through a distribution device outlet of the distribution device;

directing the lubricant from the distribution device outlet to the pin through a second pin passageway inlet, along the second pin passageway, and to a second pin passageway outlet; and directing lubricant outside of the pin via the second pin passageway outlet.

\* \* \* \* \*